(12) United States Patent
Illston

(10) Patent No.: US 7,854,885 B2
(45) Date of Patent: Dec. 21, 2010

(54) METHOD OF MAKING AN ARTICLE

(75) Inventor: Trevor John Illston, Malvern (GB)

(73) Assignee: Materials Solutions, Edgbaston, Birmingham (GB)

( * ) Notice: Subject to any disclaimer, the term of this patent is extended or adjusted under 35 U.S.C. 154(b) by 0 days.

(21) Appl. No.: 12/253,276

(22) Filed: Oct. 17, 2008

(65) Prior Publication Data

US 2009/0104065 A1 Apr. 23, 2009

Related U.S. Application Data

(60) Provisional application No. 60/981,120, filed on Oct. 19, 2007.

(51) Int. Cl.
*B22F 7/02* (2006.01)

(52) U.S. Cl. .......................................................... 419/6

(58) Field of Classification Search ........................ None
See application file for complete search history.

(56) References Cited

U.S. PATENT DOCUMENTS

| 5,555,481 A | 9/1996 | Rock et al. |
| 6,589,471 B1 | 7/2003 | Khoshnevis |
| 2004/0018107 A1 | 1/2004 | Khoshnevis |
| 2004/0137228 A1 | 7/2004 | Monsheimer et al. |

FOREIGN PATENT DOCUMENTS

| EP | 1 775 104 A1 | 4/2007 |
| WO | 01/38061 A1 | 5/2001 |
| WO | 2004/058487 A1 | 7/2004 |

*Primary Examiner*—Jessica L Ward
*Assistant Examiner*—Yoshitoshi Takeuchi
(74) *Attorney, Agent, or Firm*—Volentine & Whitt, PLLC

(57) ABSTRACT

A method of making an article having at least one re-entrance surface includes the steps of (a) forming a layer of metal powder on a base, (b) selectively laser fusing portions of the layer, and (c) repeating steps (a) and (b) to form the article, each step (a) being performed on the preceding layer characterised in that prior to performing step (a) in a layer which will initiate the formation of a re-entrant feature reversibly bonding at least some of the unfused underlying powder such that it is stable under the application of the laser.

4 Claims, 1 Drawing Sheet

METHOD OF MAKING AN ARTICLE

BACKGROUND

This invention relates to a method of making an article having at least one re-entrant surface.

Rapid Prototyping of plastics by various techniques is well known and more recently metal powders have been processed by laser in layers. It is equally well known that support structures ('scaffolding') are frequently required and these may be provide in the same material or by a secondary material that may be e.g. water soluble or melts at a lower temperature to the primary material used to build the desired prototype article. It is also known to form an article by using adhesive droplets deposited on each thin powder layer to create bonding. Such a process is "3D printing" as described in U.S. Pat. No. 6,589,471. Also known is where a 'green' article is first formed e.g. in Metal Injection Moulding whereby metal powder is bonded together by a binder which is then fired to form the nominally solid article. These are inherently never 100% dense and are not useful for many applications—particularly where internal voids can precipitate fatigue cracking. Such bonding/firing techniques may be used to form metal parts from a metal/polymer powder raw material where firstly the polymer is melted/sintered by selective application of a laser to form a 'green' article that is subsequently fired to metal and join together the metal powder. Alternatively the article formed of powder may not be fully dense and it is subsequently infiltrated with a liquid that hardens to make a solid object.

More particularly it is known to manufacture articles by laying down successive layers of metal powder, and, after each layer has been laid down, solidifying selected portions of the layer by suitable operation of a scanning laser so that an article of simple or complex shape can be built up. Some form of support or 'scaffold' is frequently required to support a layer of the article during build and there is a significant problem with any structure in which the solidified portion is not supported by a solidified portion in the preceding layer, because if the laser is applied to a bulk of unsolidified metal powder, that powder simply balls up into clumps analogous to 'weld splatter'. Such solid supports of certain complex structures, particularly where they are located one above another, present great difficulty. Whilst they can be built, their subsequent removal to complete the article may be difficult or impossible. An example is where two rows of vanes are to be built one above another within a double walled casing.

SUMMARY

From one aspect the invention consists in a method of making an article having at least one re-entrant surface including the steps of (a) forming a layer of metal powder on a base, (c) selectively laser fusing portions of the layer; and repeating steps (a) and (b) to form the article, each step (a) being performed on the preceding layer characterised in that prior to performing step (a) in a layer which will initiate the formation of a re-entrant feature reversibly bonding at least some of the unfused underlying powder such that it is stable under the application of the laser.

The applicants have realised that by bonding such powder in a reversible way, they are able to prevent balling up of the powder, but still be able to reverse the bonding allowing subsequent removal of the powder from the article.

Typically the undersurface of the re-entrant feature in the build orientation will be at least substantially parallel to the layer.

The unfused powder may be bonded using an adhesive. This is a surprising finding as it might reasonably be expected that the heat of the laser when fusing the metal powder would also destroy the adhesive. The bonding step may subsequently be reversed, for example, by solvent, heat and/or the application of electromagnetic energy or any other suitable process. Preferably the adhesive is a hydrocarbon with low reactivity with the powdered metal.

The loose powder is preferably removed from the article subsequent to the bonding reversal e.g. by heating to a temperature below a metal hardening temperature and the article may, for example, be at least partially hollow.

Although the invention has been described above it is to be understood it includes any inventive combination of the features set out above or in the following description.

BRIEF DESCRIPTION OF THE DRAWINGS

FIG. 1b is cross-sectional view taken along line A-A of FIG. 1a.

DETAILED DESCRIPTION OF EMBODIMENTS

Figure 1B:
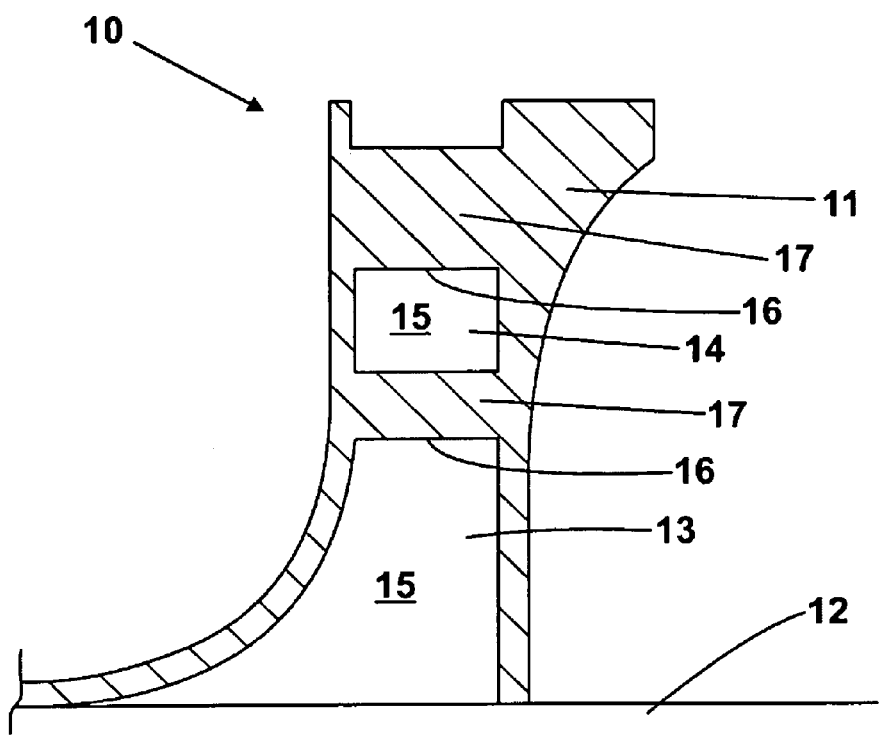
Figure 1A:
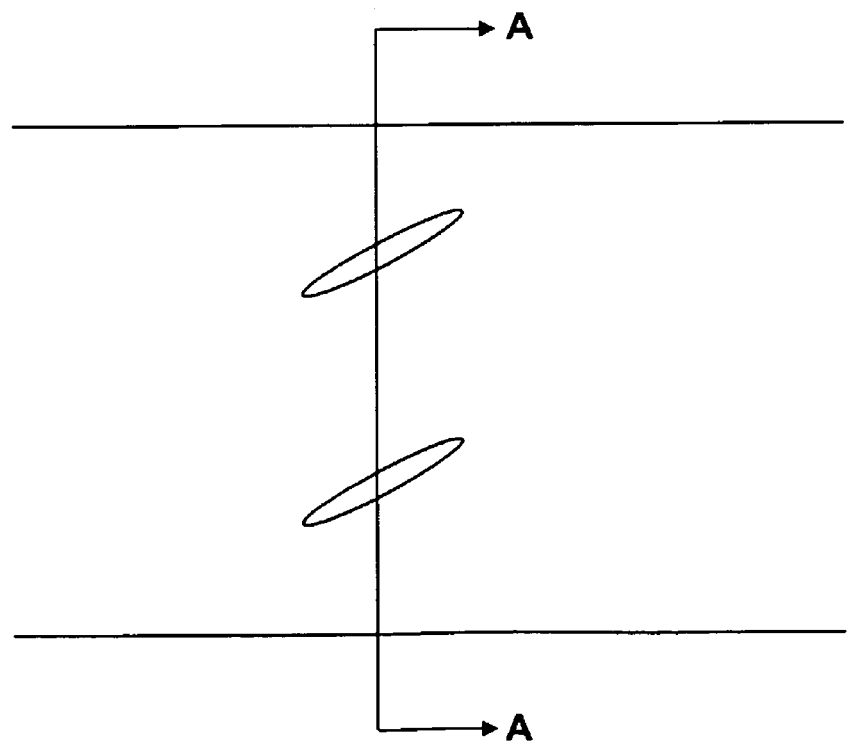
FIG. 1a is a side view of a part of a notational article processed according to one or more embodiments of the present invention.

The invention may be performed in various ways and a specific embodiment will now be described by way of example, with reference to the accompanying drawing in which FIG. 1a is a side view of a part of a notional article 10 and FIG. 1b. The drawing is a scrap cross-sectional view of the notional article 10 along the line A-A. As will be well understood by persons skilled in the art, the article portion 11 can readily be built up by the use of standard selective laser sintering processes in which a layer of material is formed on a base plate 12, selectively sintered using a scanning laser and then covered by a further layer as the base plate 12 descends by the intended layer thickness. Typically such articles contain voids, as illustrated at 13 and 14 and these remain filled with unfused powder 15.

If it is then desired to form a re-entrant surface, such as indicated at 16 as part of a further portion 17 of the article 10, then this will prove to be impossible, because the powder 15 will simply ball up as soon as the laser is applied to it.

Accordingly the applicants bond the powder 15 by stopping the build immediately before the layer 16 that would commence building feature 17 and applying an adhesive such as SUPER GLUE™ for at least a depth which is sufficient to prevent balling to take place. Thus far it has been found unnecessary to bond all the powder 15 and even where a portion 17 can be built without this technique the undersurface of portion 17 at 16 is improved by this technique—due to the absence of adhered 'weld splatter'-like material created by laser penetration into the powder 15. Without the glue the undersurface at 16 is rough and the geometry of the article 10 may present a difficulty in access for polishing to be suitable for good airflow. With the glue the surface at 16 is smooth enough not to require polishing.

In some articles, it may be acceptable to retain the bonded powder during the life of the article, but in general it will be desirable to reverse the bonding so that the powder can be removed. This may be done by the use of solvents, heat, the application of electromagnetic energy or any other suitable process.

This technique has experimentally been performed using stainless steel powder and it is expected to work with other metal powders such as high temperature metal alloys widely used in aerospace.

What is claimed is:

1. A method of making an article, comprising:
   (a) forming a preceding layer of metal powder on a base;
   (b) exposing a selected portion of said preceding layer to the energy of a laser to thereby fuse one portion of the layer of metal powder and leave another portion of metal powder in the layer un-fused;
   (c) subsequently reversibly bonding a bulk of un-fused metal powder of said preceding layer including at an exposed surface of the preceding layer;
   (d) forming a subsequent layer of metal powder on the preceding layer after the un-fused metal powder has been reversibly bonded in the preceding layer; and
   (e) exposing the subsequent layer of metal powder, which is located over said exposed surface of the preceding layer, to the energy of a laser to thereby form a re-entrant surface of fused metal powder, wherein the re-entrant surface has an interface with the bulk of reversibly bonded but un-fused metal powder of the preceding layer, and the reversible bonding prevents said bulk of metal powder of the preceding layer from balling up when the metal powder of the subsequent layer is being fused by the energy of the laser.

2. A method as claimed in claim 1 wherein the bonding of said bulk of the metal powder of said preceding layer comprises applying an adhesive to the preceding layer.

3. A method as claimed in claim 2 further comprising subsequently applying a solvent, heat and/or electromagnetic energy to the adhesive to release the adhesive at the interface.

4. A method as claimed in claim 1 further comprising subsequently separating the un-fused metal powder of the preceding layer from the fused metal powder.

* * * * *